(12) United States Patent
Lewis et al.

(10) Patent No.: US 6,570,730 B1
(45) Date of Patent: May 27, 2003

(54) SHEAR-BASED TRANSDUCER FOR HDD READ/WRITE ELEMENT HEIGHT CONTROL

(75) Inventors: Derek A. Lewis, Minneapolis, MN (US); Wayne A. Bonin, North Oaks, MN (US); Anthony P. Sannino, Shakopee, MN (US); Zine-Eddine Boutaghou, Vadnais Heights, MN (US); Lee C. Knippenberg, Burnsville, MN (US)

(73) Assignee: Seagate Technology, LLC., Scotts Valley, CA (US)

( * ) Notice: Subject to any disclaimer, the term of this patent is extended or adjusted under 35 U.S.C. 154(b) by 0 days.

(21) Appl. No.: 09/472,262

(22) Filed: Dec. 27, 1999

Related U.S. Application Data
(60) Provisional application No. 60/138,373, filed on Jun. 9, 1999.

(51) Int. Cl.[7] ............................................. G11B 21/02
(52) U.S. Cl. .................. 360/75; 360/234.7; 360/294.4; 360/294.7; 29/603.04
(58) Field of Search .......................... 360/25, 31, 75, 360/78.05, 294.4, 294.7, 234.7; 29/603.04

(56) References Cited

U.S. PATENT DOCUMENTS

| | | | |
|---|---|---|---|
| 3,732,552 A | 5/1973 | Walraven ................. 340/174.1 |
| 4,340,956 A | 7/1982 | Miller ......................... 369/244 |
| 4,605,977 A * | 8/1986 | Matthews .................... 360/103 |
| 4,669,011 A | 5/1987 | Lemke ........................ 360/103 |
| 4,853,810 A | 8/1989 | Pohl et al. .................... 360/103 |
| 5,021,906 A | 6/1991 | Chang et al. ................ 360/103 |
| 5,276,573 A | 1/1994 | Harada et al. ............... 360/103 |
| 5,377,058 A | 12/1994 | Good et al. .................... 360/75 |
| 5,764,432 A | 6/1998 | Kasahara ...................... 360/75 |
| 5,898,541 A * | 4/1999 | Boutaghou et al. .......... 360/109 |
| 6,272,909 B1 * | 8/2001 | Yao et al. ...................... 73/105 |
| 6,351,354 B1 * | 2/2002 | Bonin ...................... 360/294.6 |

* cited by examiner

*Primary Examiner*—David Hudspeth
*Assistant Examiner*—Mitchell Slavitt
(74) *Attorney, Agent, or Firm*—Kinney & Lange, P.A.

(57) ABSTRACT

To allow for adjusting the fly height of a read/write head carried by a slider, a shear transducer is added to the slider. The shear transducer comprises a layer of piezoelectric material added to the slider so that the portion of the slider carrying the read/write head can be moved when the shear transducer is sheared. To cause the shear transducer to shear, a voltage is applied across the piezoelectric layer. To control the movement of the transducer, a closed-loop control system is used. The control system senses the spacing between the read/write head and the disc surface, compares the sensed spacing to a desired spacing, and adjusts the voltage applied to the shear transducer to reduce the difference between the actual and desired spacing.

17 Claims, 8 Drawing Sheets

SHEAR-BASED TRANSDUCER FOR HDD READ/WRITE ELEMENT HEIGHT CONTROL

CROSS-REFERENCE TO RELATED APPLICATION(S)

This application claims priority from Provisional Patent Application Ser. No. 60/138,373 filed on Jun. 9, 1999, for "Shear-based Transducer for HDD Read/Write Element Height Control" by Derek A. Lewis, Wayne A. Bonin, Anthony P. Sannino, Zine-Eddine Boutaghou, and Lee C. Kippenberg.

BACKGROUND OF THE INVENTION

The present invention relates to a disc drive slider having an adjustable fly height, and more particularly to a disc drive slider having a piezoelectric shear based transducer for magnetic spacing control of the read/write head fly height.

Disc drives are well known in the art and comprise several discs, each disc having several concentric data tracks for storing data. A read/write head is used to read from or write to a data track on a disc. The head is positioned above a data track on a disc by moving an actuator suspension arm on which the head is attached. The head is carried in a slider which flies a small distance above the disc due to an air bearing created as the disc is spun. A pre-load in the suspension arm maintains the downward force on the slider. The distance at which the head is suspended above the disc is called the fly height. To meet the demand for increased areal density on discs, the head must fly at ever decreasing distances from the disc surface.

Several variables affect the fly height of the slider and thus the distance between the head it carries and the disc surface. For instance, fly height is impacted by such factors as the curvature or roughness of the disc surface, shock and vibration, and variation in the aerodynamics of the slider due to changing the orientation and position of the slider. Particularly, it is a challenge to keep the head at the required fly height as the head is moved back and fourth by the actuator arm to position it above different tracks. Vibrations in the system caused by the spindle motors also effect fly height.

In an attempt to control the fly height, design changes to the suspension on which the head is attached have been implemented. In addition, the shape of the slider has been altered in an attempt to affect the aerodynamics involved. Other attempts involve placing transducers on the head suspension mechanism in an attempt to change the pre load on the air bearing, or bending the slider via piezoelectric elements. Often these remedies are very expensive to manufacture, and do not address all of the variables affecting fly height, including the slider orientation relative to the disc due to changes in air bearing shape.

One attempt to control the fly height of the slider is disclosed in U.S. Pat. No. 4,853,810 entitled "Method and Apparatus for Controlling the Fly Height of the Head in Magnetic Storing Unit." Yet another method of controlling fly height is disclosed in U.S. Pat. No. 5,021,906 entitled "Programmable Air Bearing Slider including Magnetic Read/Write Element."

Thus, there is a continuing need in the art for a slider having an adjustable fly height that is feasible to manufacture and can be easily controlled to move the read/write head in relation to the disc surface.

BRIEF SUMMARY OF THE INVENTION

The present invention makes it possible to vary the fly height of a portion of a slider carrying a read/write head to insure a more accurate and reduced distance between the read/write head and the surface of the disc. To achieve this, a shear transducer is incorporated into the slider which allows a portion of the slider carrying the read/write head to be adjusted. The shear transducer comprises a layer of piezoelectric material added to the slider so that a portion of the slider carrying the read/write head can be moved when the shear transducer is energized. To cause the transducer to shear, a voltage is applied across the piezoelectric layer. The piezoelectric layer is polarized so that when a voltage is applied, the portion of the slider carrying the head can be moved closer to or further away from the disc surface in a vertical direction relative to the disc.

To control the movement of the transducer, a closed-loop control system is used. The control system includes a sensor for measuring the spacing between the head and the disc surface, an estimator to determine the voltage and an estimated position of the read/write head based on the sensor data, and a feedback controller for adjusting the voltage applied to the shear transducer based a comparison of the sensed position and a desired fly height. Once a voltage is applied to the shear transducer, the fly height of the slider portion carrying the head is measured, and the voltage is adjusted based on this measurement so that the piezoelectric layer either raises or lowers the portion of the slider carrying the read/write head.

DETAILED DESCRIPTION

Figure 1:
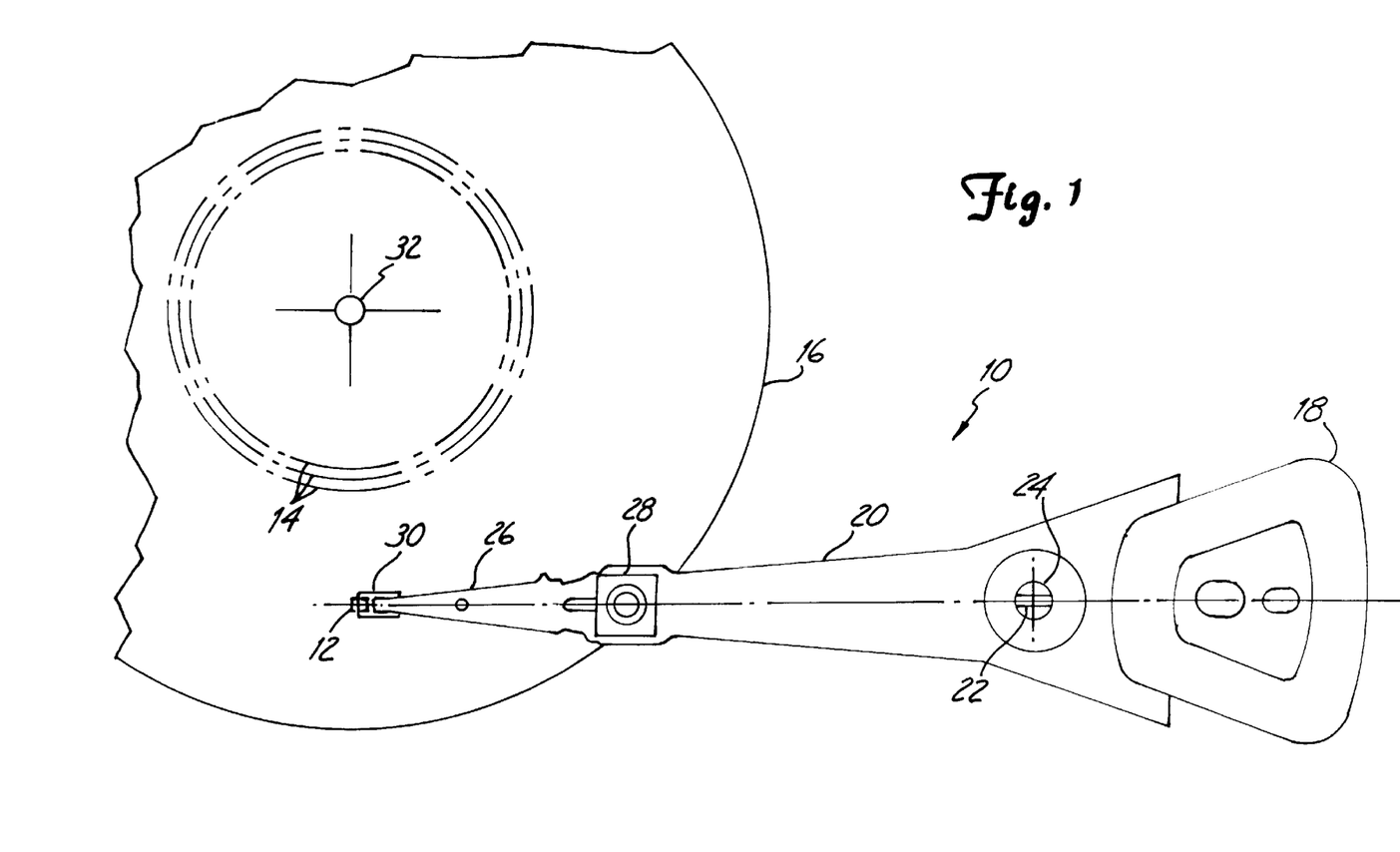
FIG. 1 is a plan view of disc drive actuation system for positioning a slider over tracks of a disc.

FIG. 1 is a plan view of a disc actuation system 10 for positioning a slider 12 over a selected data track 14 of a magnetic storage medium 16, such as a disc. An actuation system 10 includes a voice coil motor (VCM) 18 arranged to rotate actuator arm 20 around axis 22 on spindle 24. The slider suspension includes a load beam 26 connected to the actuator arm 20 at a slider mounting block 28. A gimbal 30 is connected to an end of the load beam 26, and carries the slider 12. The slider 12 carries a read/write head for reading from or writing to the concentric tracks 14 of the disc 16.

The disc 16 rotates about an axis 32, so that windage is encountered by the slider 12 to keep it aloft a small distance above the surface of disc 16. The slider 12 must be able to closely follow the surface of the disc 16, including any imperfections in the topography of the disc 16, as the slider 12 travels over the spinning disc 16.

Figure 2:
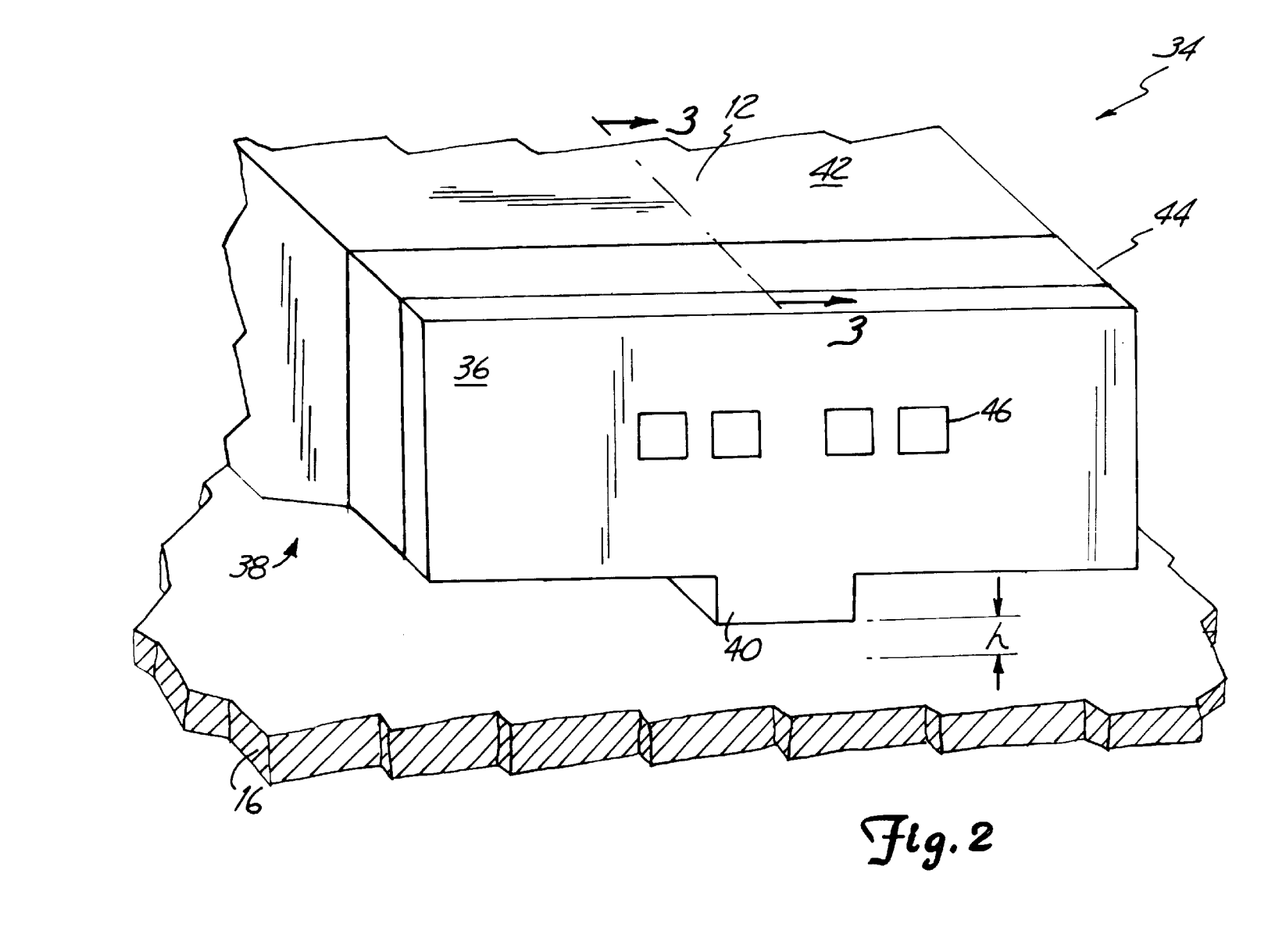
FIG. 2 is a perspective view of a disc drive slider showing the trailing edge of the slider as it is positioned over a disc.

FIG. 2 is a greatly enlarged perspective view of a portion of a head gimbal assembly 34 showing a portion of the disc drive slider 12. The slider 12 has a trailing edge surface 36 and is positioned above the disc 16. Slider 12 includes an air bearing surface (ABS) 38, a center pad 40, a top surface 42, a shear transducer 44, and bond pads 46. The air bearing surface 38 is aerodynamically designed so that windage encountered due to rotation of the disc 16 causes the slider 12 to "fly" a small distance h (the glide height) above the surface of the disc 16. In the case of a read/write slider, a read/write head is carried by the slider 12 at the trailing edge surface 36 for reading data from the disc 16 and writing data to the disc 16. Bond pads 46 on trailing edge surface 36 provide an area for electronic leads to be attached to slider allowing electronic signals to pass from and to the read/write head.

The shear transducer 44 allows the portion of the slider 12 carrying the head (near the trailing edge surface 36) to be adjusted so that it more closely follows the surface of the disc 16 as the slider 12 moves over the disc 16 surface. Specifically, it is possible to apply a voltage across the shear transducer 44 via conductive surfaces and cause the free surface 36 to move in parallel to the base of the slider 412. As the shear transducer 44 shears, the portion of the slider next to the shear transducer 44 is moved. Since the head is deposited on the portion of the slider next to the shear transducer 44, the head is moved as well. Thus; the head can be moved closer to or further away from the surface of the disc 16 based on the voltage applied to the shear transducer 44.

Figure 3A:
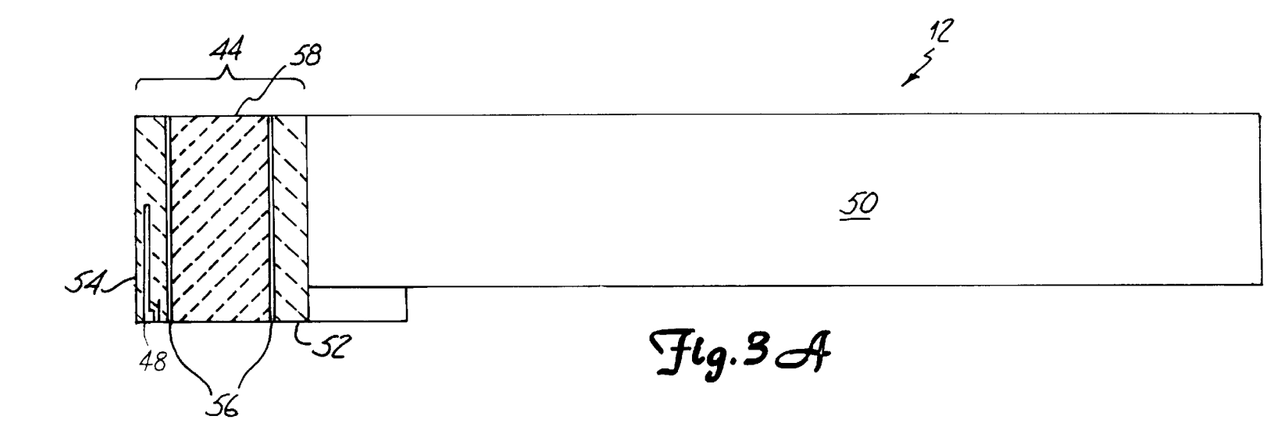
FIG. 3A is a cross sectional view of the slider 12 taken along line 3—3 in FIG. 2.

FIG. 3A provides a cross sectional view of the slider 12 taken along line 3—3 in FIG. 2. The slider 12 comprises the shear transducer 44 attached to a body 50. The shear transducer 44 comprises a first insulator layer 52, a second insulator layer 54, conductive metallic layers 56, and a piezoelectric layer 58. Located in the second insulator layer 54 is a read/write head 48; It is important for the slider 12 to maintain a desired fly height so that the read/write head 48 located in insulating layer 54 is carried at a distance which optimizes the ability of the read/write head 48 to read data from and write data to a disc.

The body 50 of the slider 12 is typically formed of silicon or other suitable material, such as aluminum titanium carbonate, silicon, or silicon carbonate. The insulating layers 52, 54 are typically formed of alumina. The insulating layers 52, 54 have two functions, the first is to act as an insulator and the second is to provide a suitable surface to which the conductive layers 56 can be bonded. The insulating layers 52, 54 provide insulation so that when charge is applied to the conductive layers 56, charge is not transferred through the body of the slider 50. Specifically, the second alumina insulator 54 prevents electrical paths from passing through the insulating layer 54 to the head 48, which could interfere with the operation of the head 48 and potentially damage it. Further, the insulating layers 52, 54 prevent voltage discharge between the surface of the air bearing and, the disc, which damages the disc.

The alumina layers 52, 54 also provide a surface to which the conductive layers 56 can be bonded. The conductive metallic layers 56 may be a thin layer of metal deposited on the aluma and attached to the piezoelectric layer 58 with a conductive epoxy. Suitable metals for the metallic layers 56 are gold, platinum, or nickel, all of which exhibit low corrosion and are easy to deposit. Suitable conductive epoxies are those which are qualified to work in a hard drive environment. In addition to using a conductive epoxy, it is also possible to attach the conductive layers 56 to the alumina layers 52, 54 using a fusion bonding method or by depositing a thin layer of metal on the alumina layers 52, 54. Conductive epoxies alone, without a metallic layer, may also be used.

It may also be possible to deposit the conductive layers 56 on the piezoelectric layer 58 (rather than the alumina) using either a form of adhesive bonding, or by depositing. Care must be taken when working with the piezoelectric layer 58 so as not to damage the layer 58 during the process of attaching the conductive layers 56. For this reason, it is preferable to attach the conductive layers 56 to the alumina rather than the piezoelectric layer 58.

Figure 3B:
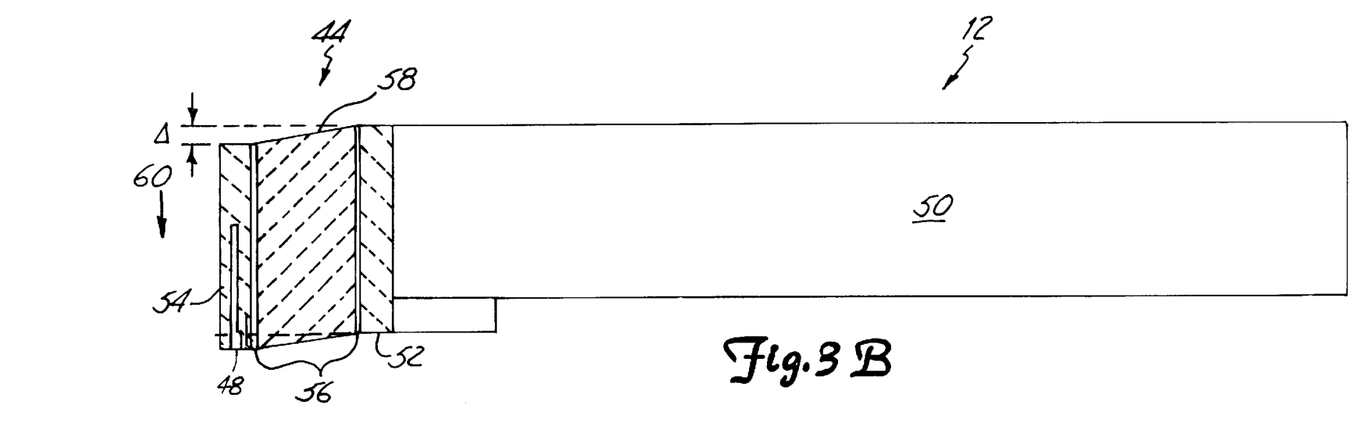
FIG. 3B is a cross sectional view of the slider taken along line 3—3 in FIG. 2 showing the shear transducer in a sheared position.

Options for the piezoelectric layer 56 include a lead zirconate titanate (PZT), barium zirconate titanate, or suitable piezoelectric materials, such as ceramics or polymers, which exhibit the desired piezoelectric properties. The importance of the shear transducer 44 is that once voltage is applied across the piezoelectric layer 58 at the conductive metallic layers 56, the layer 58 will shear, or distort in shape. As the piezoelectric layer 58 is sheared, the head 48 carried in the second alumina layer 54 is moved in the direction of the shear. Thus, by applying a voltage across the piezoelectric layer 58, it is possible to move the head 48, closer to or farther away from a disc surface. FIG. 3B further illustrates the shearing effect of the present invention.

FIG. 3B is a cross sectional view of the slider taken along line 3—3 in FIG. 2 showing the shear transducer 44 in a sheared position. The slider 12 is shown after a voltage has been applied across the shear transducer 44. As a result, the piezoelectric layer 58 has sheared and the outer alumina layer 54 has moved downward in the direction of arrow 60. The head 48, which is carried in the second alumina layer 54, is likewise moved in the direction of arrow 60. The change imposition of the shear transducer 44 is denoted by Δ.

Currently, the desired fly height is about 0.8 micro inches to about 1 micro inch. With a piezoelectric layer 58 incorporated into the slider 12, the fly height of the portion of the slider 12 carrying the read/write head can be reduced. The total displacement Δ possible of the shear transducer 44 is about 0.9 micro inches with transducers 44 made of PZT. Since the fly height of the slider 12 is normally about 1.0 micro inch, the shear transducer 24 makes it possible to finely tune the distance at which the head 48 is flown throughout almost the entire range of fly height for the slider 12. Currently, a preferred fly height of the head 48 when using a shear transducer 44 is to keep the head 48 less than 1 micro inch, and preferably at about 0.5 or 0.7 micro inches, above the disc surface.

The overall dimensions of a typical slider, including the shear transducer, are a length of about 1.25 millimeters (49 mils), a width of about 1.0 millimeters (39 mils), and a depth of about 0.3 millimeters (12 mils). To achieve the displacement of 0.9 micro inches, a voltage of plus or minus 40 volts is applied to the piezoelectric layer 58. At 40 volts, the piezoelectric layer 58 must be about 4 mils thick. As described more fully below, the piezoelectric layer 58 must be polarized to ensure the layer will shear as desired when a voltage is applied to it. The polarity induced in the piezoelectric material; can be destroyed if excessive voltage is applied. The 4 mil thickness of the piezoelectric layer 58 ensures that 40 volts across the piezoelectric layer 58 will not depole it.

The thickness of the piezoelectric layer 58 may vary depending on the material used and the desired voltage used. Forty volts is used as an example voltage because it meets certain safety factors and will not cause injury to a person should a person inadvertently become exposed to the circuit. Other voltages may be used in implementing the present invention. A higher voltage is possible, but it becomes more expensive to insulate the connecting wires and higher voltages may potentially interfere with the read/write head.

Figure 4:
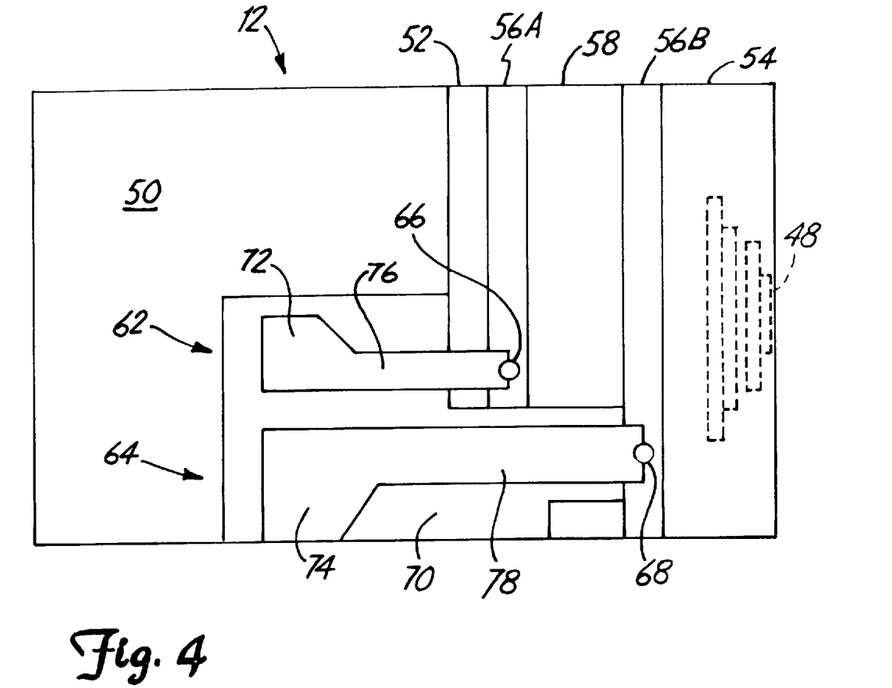
FIG. 4 is a top plan view of a processed bar showing the shear transducer and conductor leads.

FIG. 4 is a top plan view of the slider 12 illustrating how a voltage may be applied across the piezoelectric layer 58. Visible on the slider 12 is the slider body 50, first and second insulating layers 52, 54, conductive layers 56A, 56B, and the piezoelectric layer 58. An outline of the read/write head 48 is visible showing its location in second insulating layer 54. Also shown on the top of the slider 12 is a first conductor 62 connected to the conductive layer 56A and a second conductor 64 connected the outer conductive layer 56B. The conductors 62, 64 are attached to the conductive layers 56A, 56B at bond points 66, 68. Under the conductors 62, 64 is an insulating pad 70. The conductors 62, 64 consist of a contact pad area 72, 74 as well as a narrow lead area 76, 78. The narrow lead areas 76, 78 are so designed to ensure they are flexible enough to function throughout the displacement caused when the piezoelectric layer 58 shears. The contact pad areas 72, 74 are much larger to make it easier to form connections to the conductors 62, 64.

The insulating pad 70 is typically formed of mylar or another suitable polymer that has the required flexibility to maintain an attachment to the conductive layers 56A, 56B even after the piezoelectric layer 58 has been sheared without impeding the movement of the piezoelectric layer 58. The insulating pad 70 provides insulation under the conductors 62, 64 so that the conductors 62, 64 can be arranged across the layers of the shear transducer 44.

The conductors 62, 64 are created on the insulating pad 70 by applying a conductive maternal to the pad's surface 70. The conductive material layer may be applied by printing a conductive material on the insulating pad 70, by vapor depositing a conductive layer onto the pad 70, or by using another suitable method. The coated pad 70 is then etched so that some of the conductive material is removed from the insulating pad 70, and so that the remaining conductive material creates the conductors 62, 64.

Other options for creating the connectors to the conductive layers are available. For instance, the conductors 62, 64 may be fabricated from fine wires, such as gold or another suitable non-brittle metal wire. When using fine wires, there is no need for the insulating pad 70. Instead, the wires themselves are insulated and can be arranged so the wires start on the slider body 50 and have leads to the appropriate conducting layers 56A, 56B. The leads touch the surface of the slider only at the bonding points 66, 68 and further back on the slider body 50. In addition, another option for forming connections include direct deposit of alumina and gold conductors on the transducer edge.

The bond points 66, 68 are the points at which the conductors 62, 64 are bonded to the conducting layers 56A, 56B. Suitable methods for making this bond include ball bonding, wire bonding, or ultrasonic bonding. In addition to bonding, other suitable methods include using a laser or conductive epoxy to create a connection between the conductors 56A, 56B and the conductive layers 62, 64.

As mentioned above, the contact pad areas 72, 74 are made larger than the lead sections 76, 78 to create a larger area to which connections can be made. Though not shown, small gold or gold plated copper wires are connected to the contact pad areas 72, 74 and extend beyond the slider 12 up the suspension arm (not shown) to the control system for the slider 12. The wire connections made at the contact pad areas 72, 74 include the voltage source for applying a voltage across the piezoelectric layer 58, using the conductive layers 56A, 56B. Once the wires are connected to the contact pad areas 72, 74, it becomes possible to control the piezoelectric layer 58 by making the layer 58 shear upon application of a voltage. Connecting wires leading to the read/write head are also necessary and may be located on the slider 12 as well.

Figures 5A, 5B:
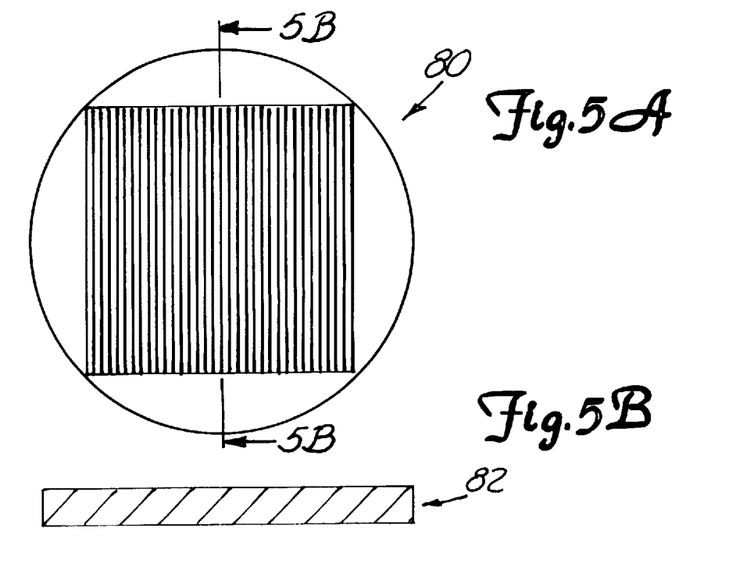
FIG. 5 is a top plan view of a wafer with bars before separation.

One problem with prior art attempts to control the fly height of a read/write head is that prior art devices are typically very difficult to manufacture and must be individually fabricated. FIG. 5A is a top plan view of a silicon wafer 80 illustrating how prior art sliders can be manufactured. A wafer 80 is the starting point for creating sliders and typically comprises aluminum titanium carbide (AlTiC) and layers added to the AlTiC which are necessary for the operation of a slider. The wafer 80 is then divided into several rectangularly shaped bars 82; Once the wafer 80 is separated into bars 82, each of the bars 82 can then be divided into several: individual'sliders.

FIG. 5B is a side view of one of the bars 82. Previously, many of the improved slider designs were created by modifying individual sliders, after the sliders had been separated from a bar 82. Because the sliders are so small and fragile, it is very expensive and time consuming to create modifications to individual sliders. If much of the slider manufacturing can take place at the wafer 80 or bar level 82, the process is more economical in terms of both money and processing steps.

Figures 6A, 6B:
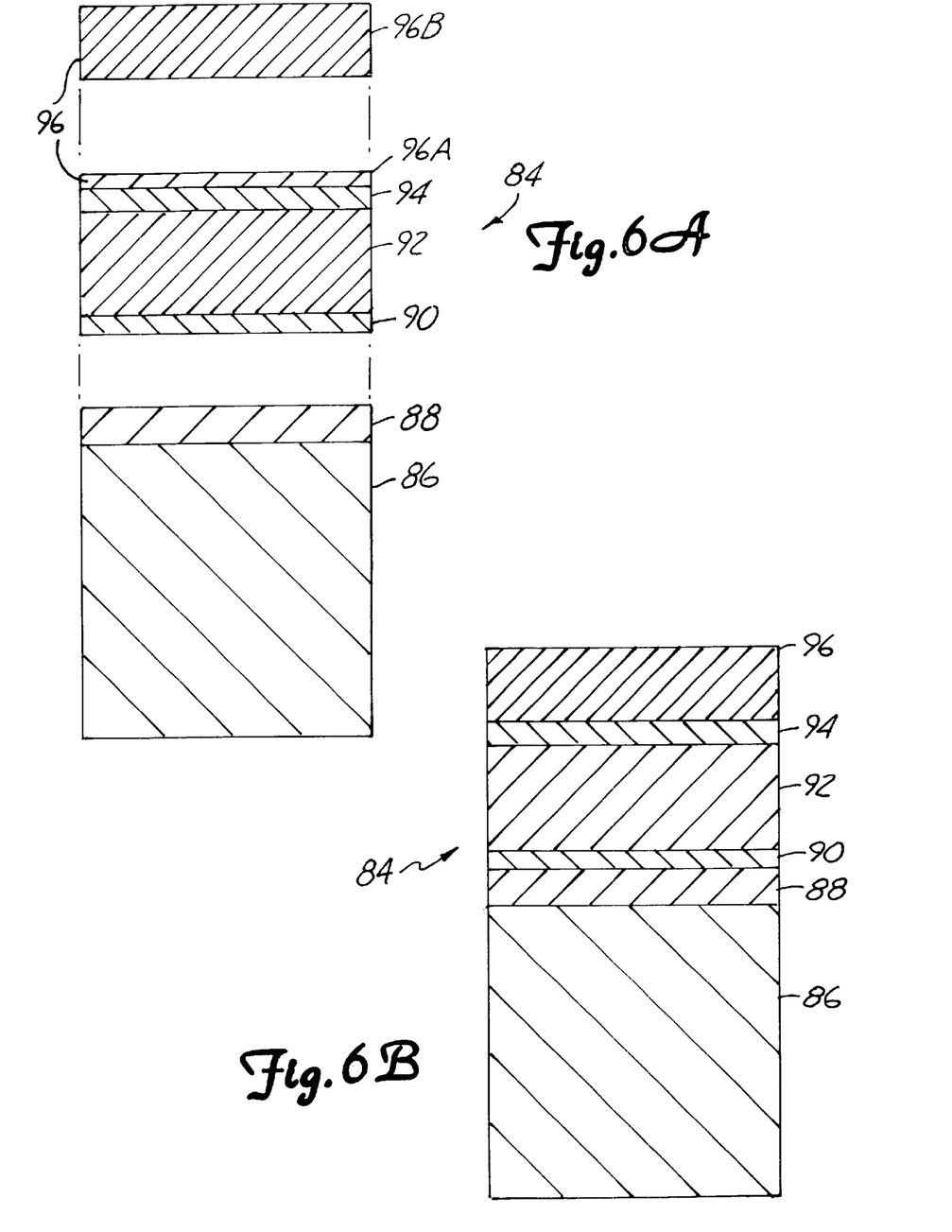
FIG. 6A is an exploded cross sectional view of another embodiment of the wafer illustrating the layers formed during manufacturing of the shear transducer.
FIG. 6B is a cross sectional view of a wafer illustrating the layers formed during manufacturing of the shear transducer.

Much of the manufacturing of the present invention can take place at the wafer level. FIG. 6A is an exploded cross section of a portion of a wafer 84 showing the structure of the wafer before it is separated into bars. The layers include the base layer 86, a first alumina insulator 88, a first conductive metallic layer 90, a piezoelectric layer 92, a second conductive metallic layer 94, and a second alumina insulator 96.

The base layer 86 of the wafer is the base of the slider, and typically is made of silicon or AlTiC. When manufacturing a shear transducer slider, there are several steps involved in creating the other layers of the shear transducer on the base layer 86. First, a layer of alumina 88 is deposited on the baselayer 86 so that the alumina has a depth of about 1 mil. The alumina layer 88 is then lapped for smoothness.

Next, the piezoelectric layer 92 is made. To do so, a sheet of piezoelectric material 92, preferably lead zirconate titanate (PZT) about 4 mils thick, is polarized. Polarizing the piezoelectric material is necessary to allow the layer to shear as desired. PZT consists of many randomly oriented crystal domains. The domains are portions of the material where the polarization is uniform in magnitude and direction. When the PZT material is prepared, the crystal structure is symmetric and the material does not exhibit any piezoelectric behavior. When a sufficiently high field is applied to the PZT, the crystal structure will develop a bias. As the field is reduced, the majority of the domains remain in the orientation they had with the field, leaving the material with a net polarization.

One method of polarizing the PZT layer used in the present invention is to pass a thin layer of PZT through a polarizing fixture comprising several non conductive rubber spacers intermixed with several positively and negatively charged conductive rubber pads in contact with the PZT. The fringing fields created by the positive and negative rubber pads polarize the PZT without damaging it. In addition, lower voltages can be used to polarize a large sheet of material due to the fringing field effect. In addition, because the PZT is in contact with the rubber pads, the dielectric effect due to air between electrodes and the PZT is greatly reduced, which again results in a lower voltage being adequate for polarizing the material.

Once polarized, each surface of the PZT material 92 then has a conductive metallic layer 90, 94 added to it, either by sputtering, vapor depositing, or chemically plating a conductive material onto the PZT sheet 92. One suitable conductive material for the conductive metallic layer 90, 94 is platinum. Once the PZT sheet 92 has the conductive layers 90, 94 on each side, the conductive layers 90, 94 are lapped for smoothness. A thin layer of an insulator 96A, such as alumina or other material compatible with the fusion bonding process, is deposited. The surface of the alumina is activated, and the PZT:layer 92 with conductive metal layers 90, 94 is clamped and fusion bonded to the wafer 86 and alumina 88. Alternatively, the PZT layer 92 is epoxied and clamped to the wafer 86 and alumina 88. To complete the wafer, a final layer of alumina 96B is deposited on the wafer so the finished layer of alumina 96A, 96B has a depth of about 3 mils. When all layers have been added, the finished wafer 84 surface is lapped for smoothness.

The finished second alumina layer 96A, 96B has a greater depths than the depth of the first layer 88, 3 mils and 1 mil respectively. The second insulating layer 96A, 96B is thicker than the first layer 88 to allow for incorporation of the read/write heads in the outer layer 96A, 96B. The read/write head can be formed in the outer alumina layer 96A, 96B in a manner well known to those skilled in the art, just as if the wafer did not have the layers forming the shear transducer. The read/write head is fabricated through a complex process of depositing, etching and plating.

FIG. 6B illustrates a method of fabricating the wafer in a slightly different manner. FIG. 6B is a cross sectional view of a portion of a wafer 84 before it is separated into bars. Once again, the manufacturing process begins with the wafer 86, which is typically aluminum titanium carbide. The other layers are then successively added to the base layer 86, beginning with the first layer of alumina 88. The first layer of alumina 88 is deposited on the wafer 86 to a depth of about 1 mil thick and the alumina surface 88 is then lapped to ensure a flat, smooth surface. Next, the first conductive metallic layer 90 is added. One method of adding the conductive metallic layer 90 is to attach the layer 90 to the alumina layer 88 using a standard conductive epoxy. Alternatively, the conductive metallic layer 90 is a platinum conductor, ink screen printed or deposited onto the alumina 88 to about one micron thick. To attach the PZT layer 92, an other conductive adhesive is used on the metallic layer 90.

Before the piezoelectric layer 92 is affixed to the wafer, the piezoelectric material 92 must be polarized. Once polarized, the piezoelectric material 92 is attached to the conductive layer 90 using the conductive adhesive. Next, a layer of adhesive is placed on the PZT layer 92 and the second conductive layer 94 is attached to the PZT layer 92 using the conductive adhesive. Finally, an outer layer of alumina 96, in which the read/write elements are embedded, is deposited to a total depth of about 3 mils and the surfaces are lapped for smoothness.

Once all the layers are applied, the wafer can be further processed to complete any remaining wafer level manufacturing. The read/write elements are added at the wafer level, using any of the processes well known to those skilled in the art. Once the manufacturing process at the wafer level is complete, the wafer is separated into bars. The bar surfaces are lapped to the desired dimensions and surface characteristics, and the air bearing profile is milled. The slider fabrication process continues at the bar level, where the conductive paths to the conductive metallic layers may be formed or fine wires are added.

Figure 7:
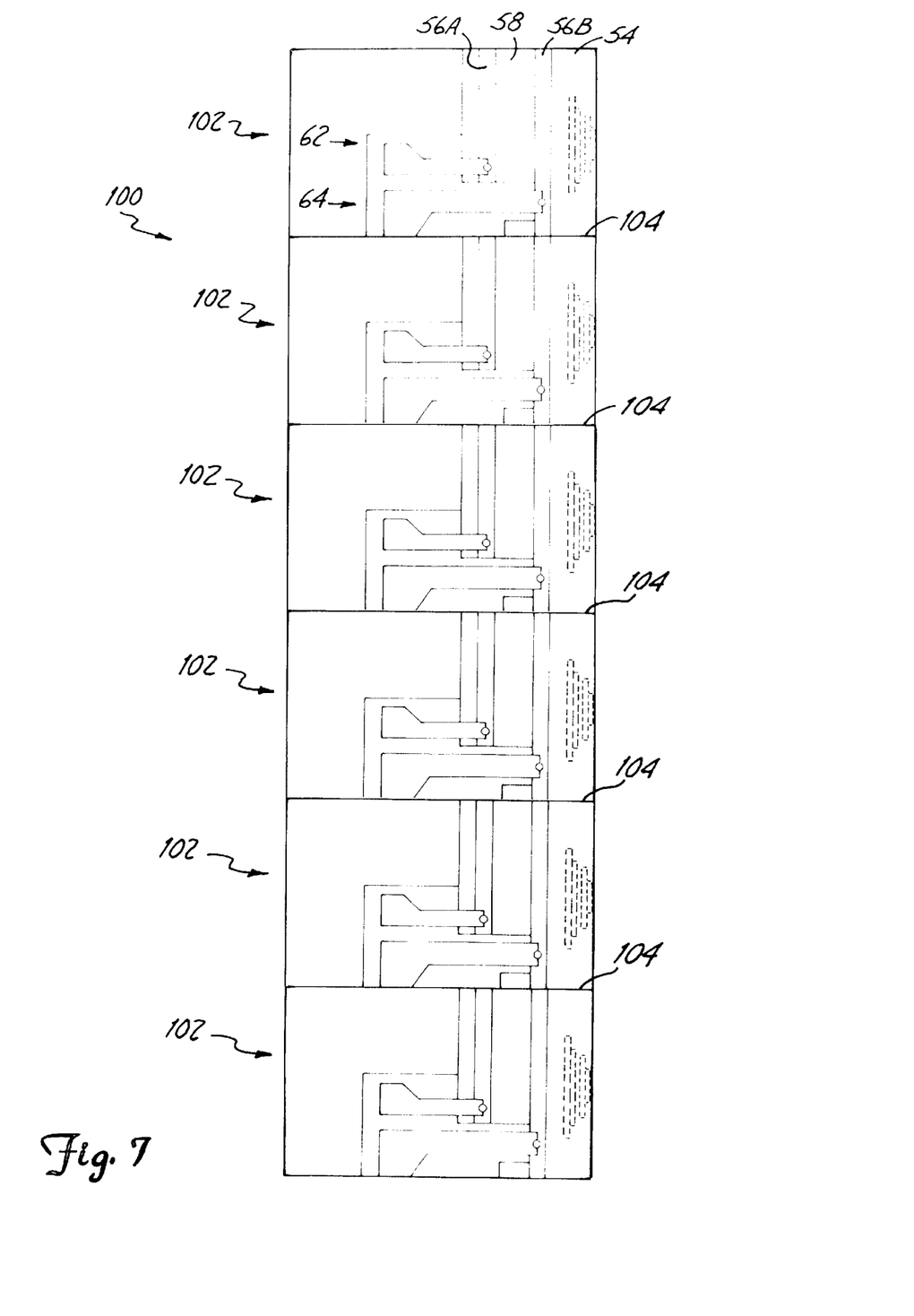
FIG. 7 is a section of a bar showing the conductor leads which are placed during manufacturing.

FIG. 7 is an illustration of a bar 100 before the bar 100 is separated into several individual sliders 102. It is possible to see the layers which make up the shear transducers of each slider 102. Specifically, the outer alumina layer 54 where the read/write head is located is shown. Also shown are conductive metallic layers 56A, 56B and the piezoelectric layer 58. The conductive layouts for the piezoelectric drives on each slider 102 have been placed on the bar 100. More specifically, shown on the top of each of the individual transducers 102 still connected as a bar 100 are the connective leads 62, 64.

The last step after reaching the configuration of FIG. 7 is to cut the bar 100 into individual sliders 102 along cut lines 104, usually using a type of saw or cutting tool. Once the bar 100 is separated into individual sliders 102, a final finishing action (lapping) may be necessary to smooth any surfaces for flatness. Any final manufacturing processes can be done at the individual slider level.

Figure 8:
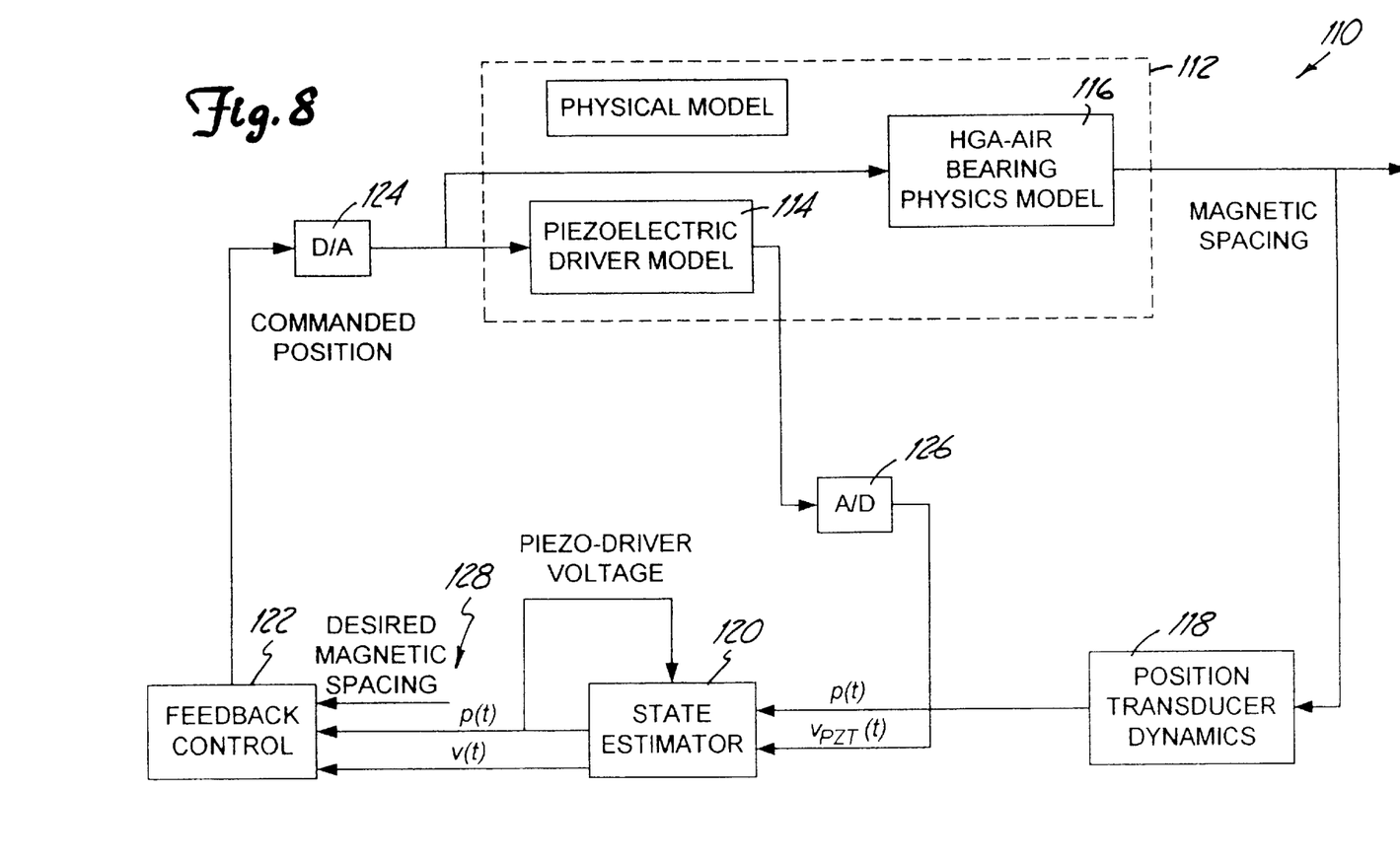
FIG. 8 is a block diagram of a control system for controlling the transducer.

In order to adjust the fly height, a control system is used in connection with the present invention. The fly height control system can be based on numerous control strategies, including but not limited to a lineal quadratic regulator, $H_\infty$, $H_2$, proportional-integral-derivative (PID); feed forward and adaptive approaches are also possible, to allow the drive to 'learn' the variations in the disc drive system. FIG. 8 is a block diagram of the components used in a closed loop control system related to the present invention. The control system structure 110 includes a physical model 112, a head gimbal assembly model 114, and a piezoelectric driver model 116. Also shown are the position transducer dynamics 118, a state estimator 120, and feedback control 122. A digital to analog (D/A) converter 124 and analog to digital (A/D) converter 126 are included, along with a desired magnetic spacing 128 which is programmed into the control system.

The components of the system 110 form a closed loop control system which allows the system 110 to adjust a position of the shear transducer based on a sensed position. More specifically, the physical model 112 comprises a piezoelectric driver model 114 and a head gimbal assembly (HGA) and air bearing physics model 116. The piezoelectric driver model 114 is a mathematical model describing how the shear transducer carrying the head moves up and down in response to the electrical circuit. As the piezoelectric material shears, the rear center pad containing the read/write element moves closer to or further away from the disc. Based upon the voltage applied, this displacement of the shear transducer can be mathematically modeled.

Once-the behavior of the shear transducer is modeled in the piezoelectric driver model 114, the behavior of the HGA and air bearing in response to the movement off the shear transducer is modeled as well. The HGA and air bearing model 116 represents the physical reality of the head gimbal assembly and the air bearing and their response to the movement of the piezoelectric transducer. The HGA model predicts the behavior of the suspension, a long stainless steel (or other suitable material) structure which carries the slider.

More particularly, the vibrations the load beam can bear as well as the behavior of the load beam should vibration occur as a result of the shear transducer are modeled and take into account when controlling the shear transducer.

The air bearing model is similar to the behavior of a fairly stiff spring. The spring-like properties of the air bearing vary with the speed of the air moving underneath it and the slider orientation. Thus, the air bearing can move the slider 12 up or down in response to changes in air pressure, air speed, and the orientation of the slider air bearing as the head gimbal assembly positions the head over a track. The modeled behavior of both the head gimbal assembly and the piezoelectric transducer can then be used by the control system to correctly apply a voltage to the shear transducer.

The control system also includes the position transducer dynamics 118, the state estimator 120, and the feed back controller 112. The state estimator 120 works in conjunction with the position transducer dynamics 118 to estimate a fly height. The position transducer dynamics 118 uses the read/write head as a sensor. In doing so, it is possible to use a variety of methods to sense the flying height of the read/write element. It may also be possible to modify such a control design by including gain scheduling or time-varying dynamics with a supervisory control scheme to update the system as required.

A preferred method of sensing the fly height is to use the magnetoresistive (MR) thermocooling effect. The MR thermrocooling effect is a phenomenon whereby as the read head moves closer to the disc, its temperature varies almost linearly to the distance of the fly height. The proximity of the read/write head to the disc changes the rate of cooling of the read/write head, thereby changing the resistive properties of the read/write head. These resistive changes can be detected by evaluating the bias voltage across the read/write head. Accordingly, the fly height of the read/write head over the disc can be estimated from the read/write signal. To track the MR thermocooling effect, the lower frequency components of the read/write signal are collected. The signal varies linearly in response to the thermal conditions, so that the distance between the read/write head and the disc can be determined.

Because the signal may drift as the disc heats up, due to the environment or other factors, the signal can be periodically readjusted to compensate for any such drift. To do so, it is possible to use magnetoresistive head "pulse width at 50% signal" (PW 50) to compensate for any drift caused as the disc is heated up. PW 50 requires collecting high frequency components of the read/write signal, rather than collecting the low frequency component used in MR cooling. The transitions at the higher frequency components are collected and a short average is performed to take the 50% level of the pulse. This signal varies nonlinearly, is not temperature driven, and also can be used to determine the distance between the head and the disk surface. The PW 50 fly height can be compared to the MR cooling fly height to verify the accuracy of the MR cooling method.

In addition to using PW 50 to periodically compensate for any drift, PW 50 can also be used as the only fly height measurement technique. PW 50 fly height measurement comes from a paper entitled, "Slider-Disk Clearance Measurements in Magnetic Disk Drives Using the Readback Transducer," written by Klaas B. Klassen and Jack C. L. Van Peppen (IBM Research Division; Almaden Research Center, San Jose, Calif. 95120), LEE Instrumentation and Measurement Technology Conference, 1993.

Examples of other methods for sensing a fly height include using a capacitance plate on the slider which detects the changes in the spacing via a tuned circuit. Another means is to place a very small probe tip near the. read/write head to measure the tunnel current flow from the tip to the disc when a bias is applied across the tip. Other similar methods well known to those skilled in the art can be used to sense the fly height.

The resulting fly height (e.g. as determined by MR cooling and PW 50) at the position transducer dynamics 118 are then used by the state estimator 120 to predict fly height . . . . The state estimator 120 gets as input a sampled position P(t) and a sampled voltage $V_{PZT}(t)$, and determines a modeled voltage $V_{PZT}(t)$ and a modeled position P(t). The state estimator 120 also is used to compensate for error in the sensing system or any noise. Once a modeled position P(t) and modeled voltage $V_{PZT}(t)$ are determined, the feedback control 112 uses the information to create a formula for refining the positioning of the head as desired. The desired magnetic spacing 128 is programmed into the control system, and the modeled position P(t) and voltage $V_{PZT}(t)$ are compared to the desired spacing 128 as part of the feedback control 122. Based on the comparison, a commanded voltage signal is sent to the digital to analog converter 126 for controlling the position of the shear transducer.

Figure 9:
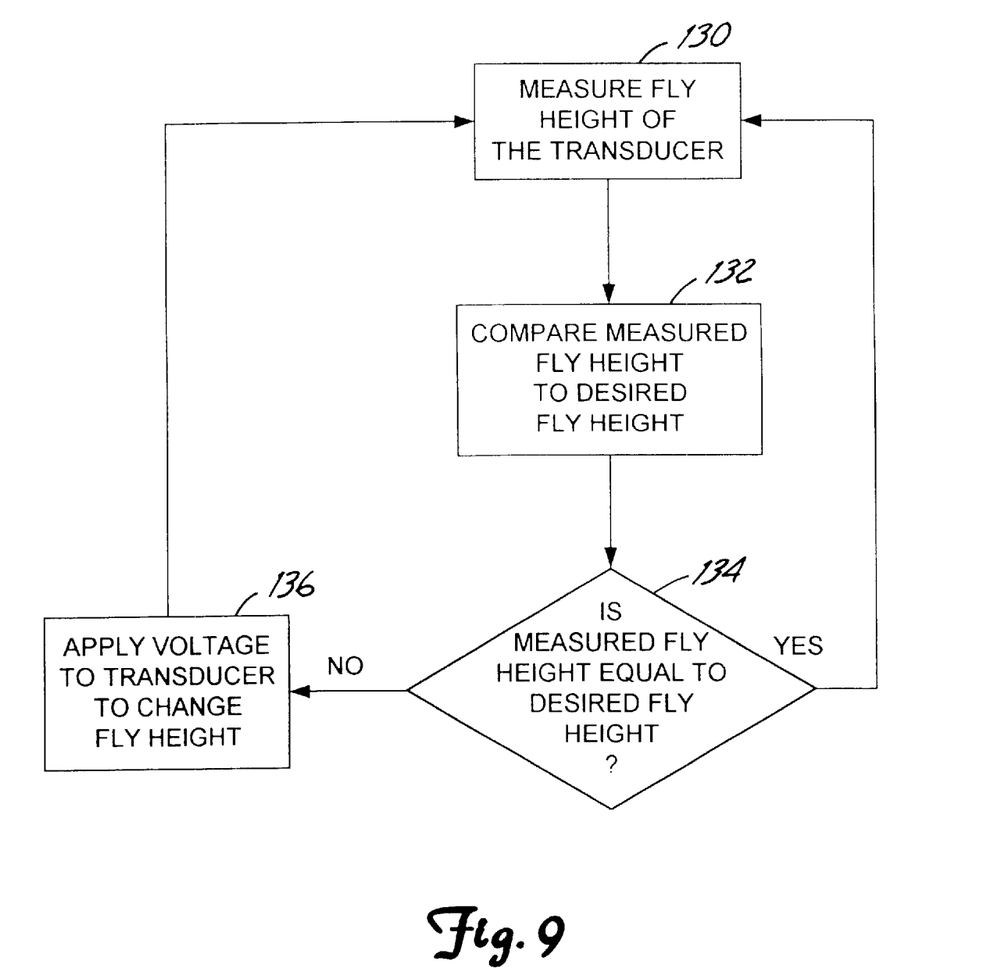
FIG. 9 is a flow diagram showing a method of controlling the transducer.

FIG. 9 more generally sets out the method for controlling the transducer. The first step 130 is to measure the fly height of the transducer. There are a varieties of ways to measure fly height, as explained above, including using the MR cooling effect along with PW 50, a capacitance plate, or a probe tip near the read/write head.

Once the fly height is determined, the measured fly height must be compared to a desired fly height, in the next step 132. Typically, the desired fly height for the head to be above the disc surface is between about 0.25 micro inches to about 0.4 micro inches, although the slider experiences considerable variation from the mean. Currently, a fly height of about 0.5 to about 0.9 micro inch is desired.

Based on the comparison, the next step 134 is to determine whether the fly height of the read/write head is equal to the desired fly height. If the measured fly height is not equal to the desired fly height, a voltage is applied to the shear transducer to adjust the flying height of the head, as shown in the next step 136. Specifically, if the measured fly height is higher than the desired fly height, the voltage to the piezoelectric layer will be adjusted to move the read/write head closer to the disc surface. If the fly height measured is lower than the desired fly height, then the voltage is adjusted to move the read/write head farther away from the disc surface. Because it is a closed loop control system, this process is repeated during the operation of the disc drive to ensure the proper fly height of the read/write head over time.

In addition to controlling fly height, the present invention may be used to improve robustness to shock. For instance, it may be possible to control the fly height of the read/write head so that it is above 1 micro inch when the head is not being used to read from or write to the disc. When the head is put into use, the present invention can be used to bring the head down to the desired flying height.

Yet another use for the present invention is to address stiction. Stiction refers to the resistance to movement that occurs when two extremely smooth surfaces are in contact with each other. This often happens because the head and the disc both have smooth surfaces. When the disc drive is not operating, the disk does not spin and the head rests on the surface of the disc. When the disc begins spinning, the head may initially stick to the surface of the disc causing an undesirable forces on the head gimbal assembly. To address this problem, textured landing zones have been added to the slider. As the disc begins to spin, the textured landing zones allow the disc to be spun with low start up torque transferring to the head gimbal, assembly because the slider can lift off the disc more easily.

The present invention can be used to lift the slider off the disc surface when the disc begins spinning, and thus avoid stiction problems. To do so, the piezoelectric layer can be sheared, bringing only the head carrying portion down onto the disc. The force directed on the surface of the disk by the shear transducer effectively lifts the rest of slider off the disc. Once lifted, the disc can be rotated and the air flow can begin beneath the slider to lift it off the disc.

Although the present invention has been described with reference to preferred embodiments, workers skilled in the art will recognize that changes may be made in form and detail without departing from the spirit and scope of the invention.

What is claimed is:

1. A disc drive slider apparatus comprising:
    a slider comprising a read/write head carried by a slider body; and
    a shear transducer attached to the slider body allowing the read/write head to be moveable by the shear transducer relative to the slider body, the shear transducer comprising
    a piezoelectric layer, conductive layers adjacent the piezoelectric layer, and first and second insulating layers adjacent the conductive layers, wherein the first insulating layer is adjacent the slider body, and wherein the second insulating layer carries the read/write head.

2. The slider apparatus of claim 1 wherein the piezoelectric layer is polarized such that when a voltage is applied to the piezoelectric layer, the piezoelectric layer will shear causing the read/write head to be moved relative to the disc surface.

3. The slider apparatus of claim 1 and further comprising a control system for controlling a voltage applied to the piezoelectric layer as a function of a sensed fly height of the slider body above a magnetic storage medium and a desired fly height.

4. The slider apparatus of claim 3 wherein the control system further controls the voltage applied to the piezoelectric layer when the slider apparatus is resting on a surface of a disc to cause the piezoelectric layer to shear and reduce stiction by lifting the slider body off the magnetic storage medium.

5. The disc drive slider apparatus of claim 3 wherein the control system further controls the voltage applied to the piezoelectric layer at the conductive layers to control a fly height of the read/write head above a magnetic storage medium by causing the piezoelectric layer to shear.

6. The disc drive slider apparatus of claim 5 wherein the voltage applied to the piezoelectric layer causes the second insulating layer to displace up to about 0.9 micro inches in a vertical axis.

7. The disc drive slider apparatus of claim 5 wherein the piezoelectric layer is polarized such that when a voltage is applied to the piezoelectric layer, the piezoelectric layer will shear causing the second insulating layer carrying the read/write head to be moved relative to a magnetic storage medium surface.

8. A method for creating a slider having a shear-based transducer, the method comprising:
    depositing a first insulator on a wafer;
    depositing a first conductive layer on a first side of a piezoelectric layer and depositing a second conductive layer on a second side of the piezoelectric layer;
    bonding the piezoelectric layer having first and second conductive layers to the first insulator on the wafer;
    depositing a second insulator on the wafer;
    separating the wafer into bars;
    placing electrodes to the first and second conductive layers for each individual slider on the bar; and
    separating the bar into individual sliders.

9. The method of claim 8 wherein the piezoelectric layer is polarized before being layered on the wafer.

10. A method for creating a slider having a shear-based transducer, the method comprising:
    depositing a first insulator on a wafer;
    adhering a first conductive layer to the wafer;
    adhering a piezoelectric layer to the wafer using an adhesive;
    adhering a second conductive layer to the wafer;
    depositing a second insulator on the wafer;
    separating the wafer into bars;
    placing electrodes to the first and second conductive layers for each individual slider on the bar; and
    separating the bar into individual sliders.

11. A method for controlling a fly height of a read/write head supported by an air bearing slider, the method comprising:
    sensing a fly height of the slider by evaluating a magnetoresistive thermocoolinig effect from a low frequency range of a magnetoresistive read signal; and
    applying a voltage to the; shear transducer connected to the slider and the read/write head as a function of the sensed fly height and a desired fly height to adjust a relative position of the read/write head with respect to the slider.

12. A shear transducer and read write head connected to a slider, the shear transducer comprising:
    a first insulating layer connected between a slider body and a first conductive layer;
    a piezoelectric layer connected between the first conductive layer and a second conductive layer;
    a second insulating layer connected to the second conductive layer, wherein the read/write head is positioned within the second insulating layer; and
    first and second conductors connected respectively to the first and second conductive layers coupled to receive a control signal to apply a voltage difference across the piezoelectric layer to cause the piezoelectric layer to shear and change the position of the read/write head relative to the slider body.

13. The shear transducer of claim 12 wherein the piezoelectric layer is polarized such that when the control signal applies a voltage difference across the piezoelectric layer, the change in position of the read/write head relative to the slider can be controlled to achieve a desired fly height.

14. The shear transducer of claim 12 and further comprising a control system for controlling the control signal as a function of a sensed fly height of the slider above a disc and a desired fly height.

15. The shear transducer of claim of claim 14 wherein the control system further controls the control signal to shear the piezoelectric layer when the slider is resting on a surface of a disc to cause the piezoelectric layer to shear and reduce stiction.

16. The shear transducer of claim 12 wherein the voltage across the piezoelectric layer causes the second insulating layer to displace up to about 0.9 micro inches in a vertical axis.

17. A method for controlling a fly height of a read/write head supported by an air bearing slider, the method comprising:

sensing a fly height of the slider by evaluating a pulse width at 50% signal; and applying a voltage to the shear transducer connected to the slider and the read/write head as a function of the sensed fly height and a desired fly height to adjust a relative position of the read/write head with respect to the slider.

* * * * *